United States Patent
Asnis et al.

(10) Patent No.: US 10,447,537 B2
(45) Date of Patent: Oct. 15, 2019

(54) AUTOMATIC DETERMINATION OF DISPLAY DEVICE FUNCTIONALITY

(71) Applicant: Roku, Inc., Los Gatos, CA (US)

(72) Inventors: Ilya Asnis, San Jose, CA (US); Daniel Martin Daly, Brownsburg, IN (US); Gregory Mack Garner, Springdale, AR (US); Scott Edward De Haas, Austin, TX (US); David Allen Westerhoff, Pleasanton, CA (US); Anthony John Wood, Palo Alto, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

(21) Appl. No.: 15/646,275

(22) Filed: Jul. 11, 2017

(65) Prior Publication Data
US 2019/0020543 A1 Jan. 17, 2019

(51) Int. Cl.
| | |
|---|---|
| *H04L 12/24* | (2006.01) |
| *H04B 10/114* | (2013.01) |
| *H04L 12/26* | (2006.01) |
| *G06F 17/25* | (2006.01) |

(52) U.S. Cl.
CPC ......... *H04L 41/0853* (2013.01); *G06F 17/25* (2013.01); *H04B 10/1143* (2013.01); *H04L 41/0233* (2013.01); *H04L 43/0811* (2013.01); *G08C 2201/42* (2013.01)

(58) Field of Classification Search
CPC ............ H04N 5/4403; H04N 21/4126; H04N 21/43615; H04N 21/41407; H04N 21/42204; H04N 2005/4425; H04N 2005/4435; H04N 21/42203; H04N 21/42221; H04N 21/42226; G06F 3/017; G06F 3/013; G06F 1/163; G06F 1/1632; G06F 3/012
USPC .................................................. 713/2; 710/5
See application file for complete search history.

(56) References Cited

U.S. PATENT DOCUMENTS

| | | | | | |
|---|---|---|---|---|---|
| 5,227,780 | A | * | 7/1993 | Tigwell | G08C 17/00 340/13.22 |
| 5,386,251 | A | * | 1/1995 | Movshovich | H04B 1/202 340/12.23 |
| 5,793,300 | A | * | 8/1998 | Suman | G07C 9/00182 340/12.29 |
| 6,124,804 | A | * | 9/2000 | Kitao | G08C 19/28 340/12.28 |

(Continued)

*Primary Examiner* — Faisal M Zaman
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for automatically determining the functionality and capabilities of electronic components. Some embodiments operate by transmitting a command to the display device in question (sometimes called the device under test—DUT—herein) and monitoring the device. Then, it is determined whether an action by the display device was one of a set of proper responses to the command. If the action was proper, then it is determined that the display device supports the command set associated with the command. The command set may be the Consumer Electronics Control (CEC) set, although this disclosure is not limited to that example.

20 Claims, 12 Drawing Sheets

(56) References Cited

U.S. PATENT DOCUMENTS

| | | | |
|---|---|---|---|
| 6,249,673 B1* | 6/2001 | Tsui | G08C 19/28 340/12.28 |
| 6,265,987 B1* | 7/2001 | Wang | G08C 19/28 340/12.28 |
| 6,944,704 B2* | 9/2005 | Brelin | H04L 12/40078 710/305 |
| 7,006,802 B2* | 2/2006 | Tsui | G08C 19/28 340/12.28 |
| 7,062,175 B2* | 6/2006 | Stevenson | G08C 17/02 398/106 |
| 7,562,128 B1* | 7/2009 | Caris | H04L 12/282 709/220 |
| 7,748,040 B2* | 6/2010 | Adelstein | H04L 63/1491 726/25 |
| 7,969,514 B2* | 6/2011 | Haughawout | G08C 19/28 340/426.13 |
| 8,190,723 B2* | 5/2012 | Datla | H04L 41/0226 370/466 |
| 8,271,287 B1* | 9/2012 | Kermani | H04N 21/42203 704/275 |
| 9,088,663 B2* | 7/2015 | Arling | G06F 3/0486 |
| 9,490,998 B1* | 11/2016 | Danciu | H04L 12/2818 |
| 2003/0001829 A1* | 1/2003 | Tanizoe | G09G 5/006 345/204 |
| 2005/0251593 A1* | 11/2005 | Lin | G06K 7/0008 710/62 |
| 2006/0259266 A1* | 11/2006 | Bizet | H04L 12/2803 702/119 |
| 2008/0043996 A1* | 2/2008 | Dolph | H04N 5/60 379/388.07 |
| 2009/0157910 A1* | 6/2009 | Maruyama | H04N 5/775 710/16 |
| 2009/0307591 A1* | 12/2009 | Pham | H04N 5/4403 715/716 |
| 2010/0041380 A1* | 2/2010 | Hewes | H04W 4/12 455/414.4 |
| 2010/0053468 A1* | 3/2010 | Harvill | H04N 5/4403 348/734 |
| 2011/0157478 A1* | 6/2011 | McRae | H04N 5/4403 348/734 |
| 2012/0133841 A1* | 5/2012 | Vanderhoff | H04N 21/42226 348/734 |
| 2012/0242526 A1* | 9/2012 | Perez | G08C 17/02 341/176 |
| 2013/0076989 A1* | 3/2013 | Barnett | H04N 5/4403 348/734 |
| 2014/0002749 A1* | 1/2014 | Pora | H04N 21/4394 348/725 |
| 2014/0023375 A1* | 1/2014 | Gilson | G08C 17/02 398/106 |
| 2014/0235258 A1* | 8/2014 | Chen | H04W 4/003 455/452.1 |
| 2016/0180806 A1* | 6/2016 | Sharp | G09G 5/006 345/520 |
| 2016/0307439 A1* | 10/2016 | Selfe | G08C 17/02 |
| 2016/0366456 A1* | 12/2016 | Martin | H04N 21/2541 |
| 2017/0024999 A1* | 1/2017 | Hayes | G08C 19/28 |
| 2017/0288895 A1* | 10/2017 | Marino | G06F 13/4022 |
| 2018/0074808 A1* | 3/2018 | O'Connor | G06F 8/65 |

* cited by examiner

Device Remote Control Database 132

| | FingerPrint | CEC Supported | Remote Control Signals |
|---|---|---|---|
| 746A | A | No | Off<br>Volume up<br>Volume down |
| 746B | B | Yes | |
| 746C | B' | No | Off<br>Volume up |
| 746D | B" | Yes | |
| 746E | C | Yes | |
| | 740 | 742 | 744 |

FIG. 7C

AUTOMATIC DETERMINATION OF DISPLAY DEVICE FUNCTIONALITY

BACKGROUND

Field

This disclosure is generally directed to automatically determining functionality supported by electronic devices.

Background

Often, a user's entertainment system includes components that have different functionality and capabilities. Consider Consumer Electronics Control (CEC), which is a feature of HDMI (High-Definition Multimedia Interface) that allows users to command and control devices connected through HDMI using a single remote control. A user's entertainment system may have some components that support CEC, and others that do not support CEC. In such systems, it is difficult if not impossible for the user to use a single remote control to control all the components in his entertainment system. This is especially true if it is not apparent to the user which components are CEC-enabled, and which are not. Also, even components that are CEC-enabled may support only a portion of the CEC command set. Thus, even for CEC-enabled components, the user may be able to use the remote control to perform only some functions. Users may be frustrated by such inconsistencies and limits, thereby negatively impacting enjoyment of their entertainment systems.

SUMMARY

Provided herein are system, apparatus, article of manufacture, method and/or computer program product embodiments, and/or combinations and sub-combinations thereof, for automatically determining the functionality and capabilities of electronic components. For illustrative purposes, embodiments are described with respect to an example of controlling display devices in a media streaming environment. However, this disclosure is not limited to these example embodiments. Instead, the functions and structures described herein are applicable to automatically determining the functionality and capabilities of any electronic components in any environment or application.

Some embodiments operate by transmitting a command to the display device in question (sometimes called the device under test—DUT—herein) and monitoring the display device. Then, it is determined whether a subsequent action by the display device was one of a set of proper responses to the command. If the action was proper, then it is determined that the display device supports the command set associated with the command. The command set may be the Consumer Electronics Control (CEC) command set, although this disclosure is not limited to that example.

In some embodiments, the command transmitted to the display device may be an audible control command (that is, a command that impacts the audio of the display device), such as Volume Up or Down, Mute, Power Off, etc. In this example, a microphone or similar means may be used to detect volume changes made by the display device in response to the audible control command.

In some embodiments, the command may be a CEC command transmitted over a HDMI link. In this example, traffic on the HDMI link may be monitored for messages transmitted by the display device.

This disclosure also includes embodiments for programming a system remote control for a display device, wherein the display device does not natively support the system remote control. Such embodiments operate by capturing infrared (IR) signals transmitted by a remote control that is supported by the device, and then monitoring for and determining one or more actions performed by the display device. The captured IR signals are associated with the determined actions, and the system remote control is programmed with the captured IR signals. Thereafter, the system remote control can be used by users to command the display device to perform the determined actions using the captured IR signals.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings are incorporated herein and form a part of the specification.

FIG. 7C illustrates an example device remote control database, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
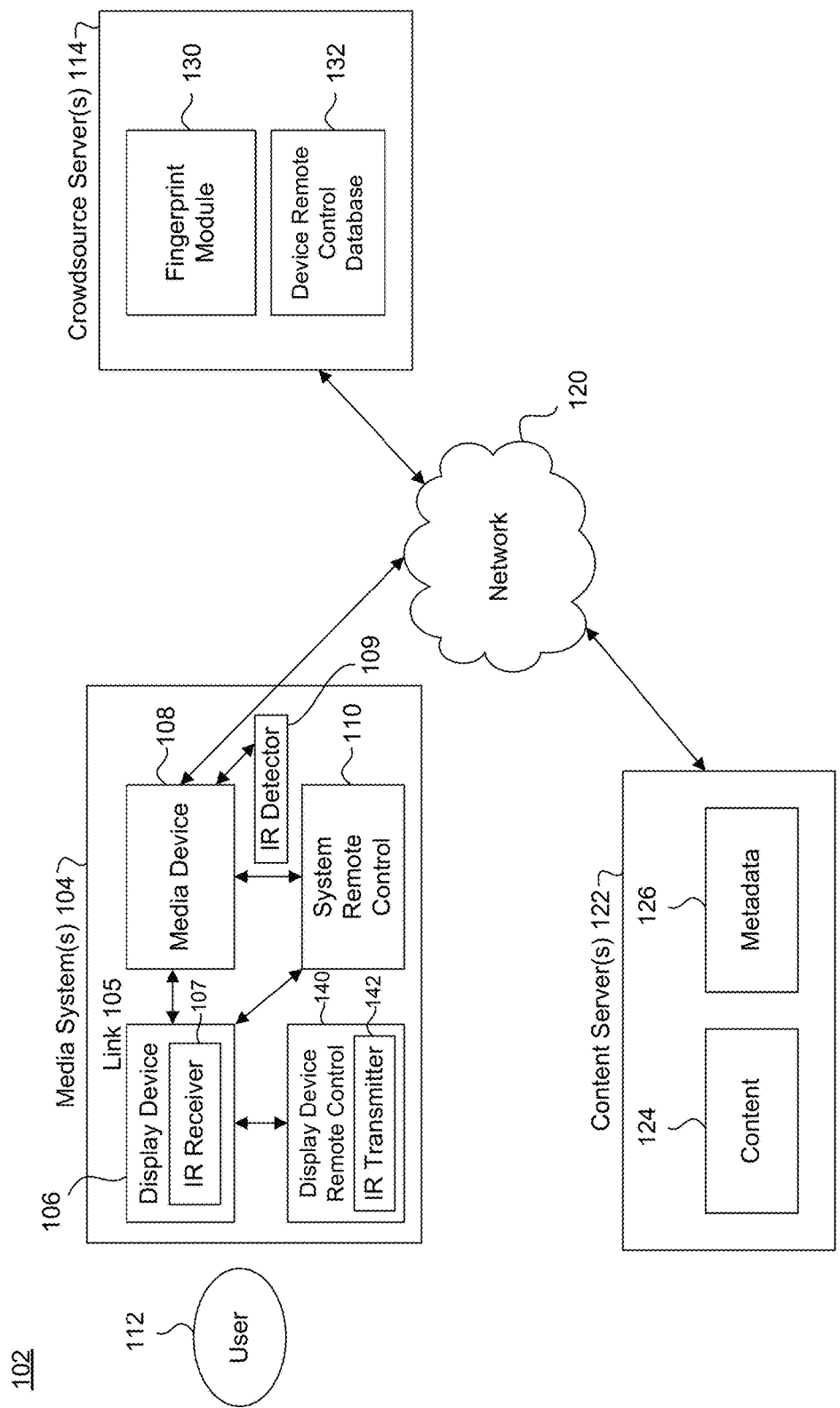
FIG. 1 illustrates a block diagram of a multimedia environment, according to some embodiments.

FIG. 1 illustrates a block diagram of a multimedia environment 102, according to some embodiments. In a nonlimiting example, multimedia environment 102 is directed to streaming media. However, this disclosure is not limited to that example embodiment.

The multimedia environment 102 may include one or more media systems 104, one or more content servers 122 and/or one or more crowdsource servers 114 communicatively coupled via a network 120. In various embodiments, the network 120 can include, without limitation, wired and/or wireless intranet, extranet, Internet, cellular, Bluetooth and/or any other short range, long range, local, regional, ad hoc, and/or global communications network, as well as any combination thereof.

Media system 104 may include a display device 106, media device 108, system remote control 110 and/or display device remote control 140. Display device 106 may be a monitor, television, computer, smart phone, tablet, and/or projector, to name just a few examples. Media device 108 may be a streaming media device, DVD device, audio/video playback device, cable box, set top box, and/or digital video recording device, to name just a few examples. In some embodiments, the media device 108 can be a part of, integrated with, operatively coupled to, and/or connected to display device 106. The media device 108 may be configured to communicate with network 120.

Content servers 122 (also called content sources 122) may each include databases to store content 124 and metadata 126. Content 124 may include any combination of music, videos, movies, TV programs, multimedia, images, still pictures, text, graphics, gaming applications, advertisements, software, and/or any other content or data objects in electronic form. In some embodiments, metadata 126 comprises data about content 124. For example, metadata 126 may include associated or ancillary information indicating or related to writer, director, producer, composer, artist, actor, summary, chapters, production, history, year, trailers, alternate versions, related content, applications, and/or any other information pertaining or relating to the content 124. Metadata 126 may also or alternatively include links to any such information pertaining or relating to the content 124. Metadata 126 may also or alternatively include one or more indexes of content 124, such as but not limited to a trick mode index.

Figure 2:
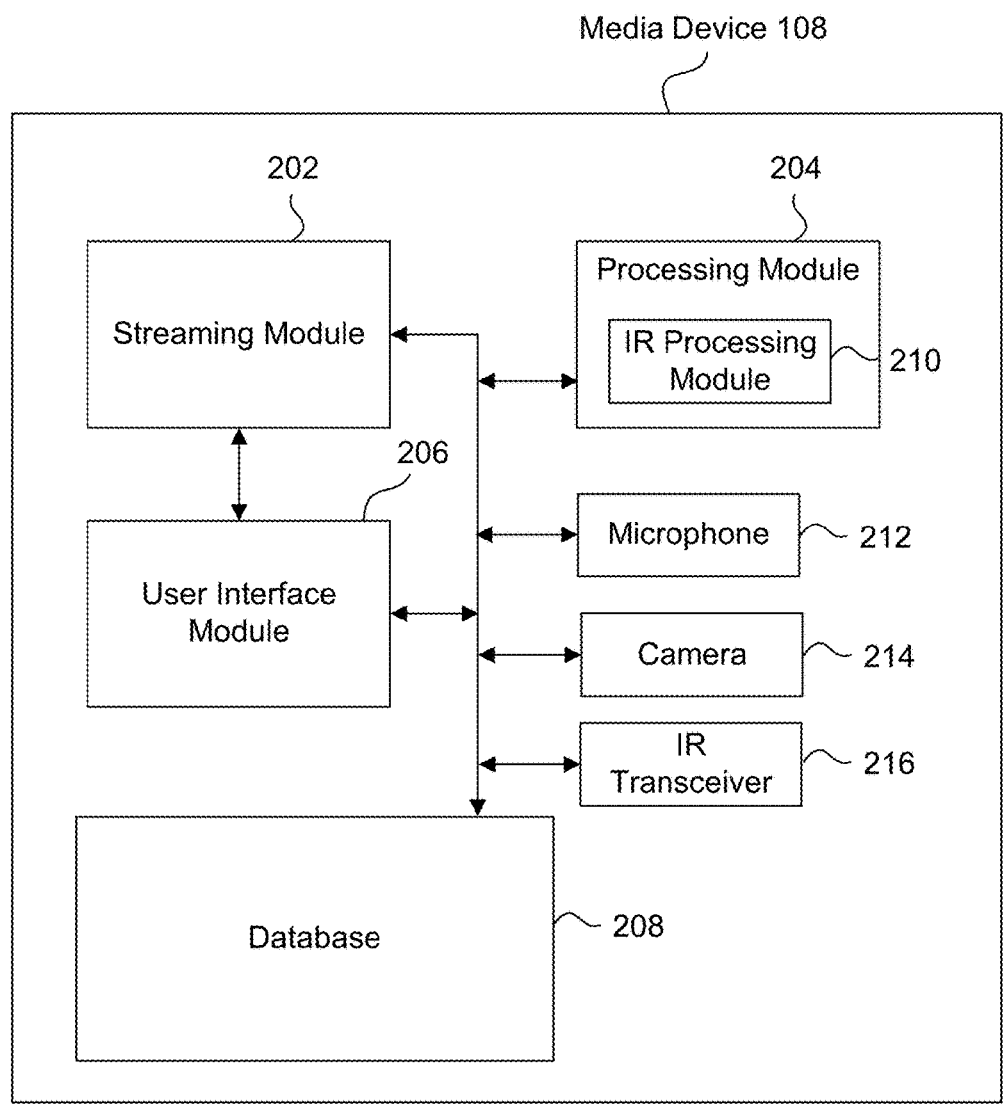
FIG. 2 illustrates a block diagram of a media device, according to some embodiments.

FIG. 2 illustrates an example block diagram of the media device 108, according to some embodiments. Media device 108 may include a streaming module 202, processing module 204, user interface module 206, database 208, microphone 212, camera 214 and/or IR transceiver 216.

Figure 3:
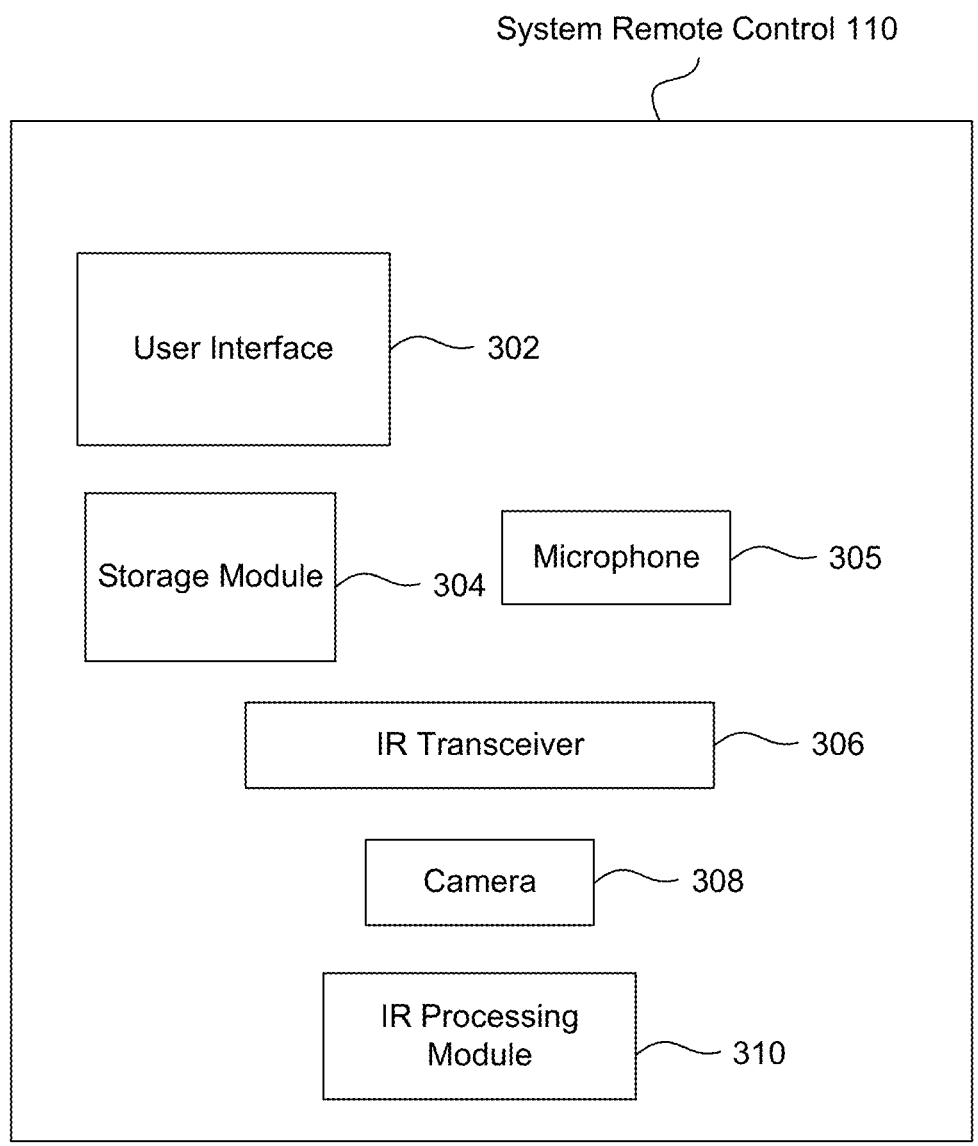
FIG. 3 illustrates a block diagram of a system remote control, according to some embodiments.

FIG. 3 illustrates an example block diagram of the system remote control 110, according to some embodiments. System remote control 110 may include a user interface 302, storage module 304, microphone 305, IR transceiver 306, camera 308 and/or IR processing module 310.

In some embodiments, user 112 may use system remote control 110 to interact with the user interface module 206 of media device 108 to select content, such as a movie, TV show, music, book, application, game, etc. The streaming module 202 of media device 108 may request the selected content from content server(s) 122 over the network 120. Content server(s) 122 may transmit the requested content to the streaming module 202. Media device 108 may transmit the received content to display device 106 for presentation to user 112. In streaming embodiments, the streaming module 202 may transmit the content to display device 106 in real time or near real time as it receives such content from content server(s) 122. In non-streaming embodiments, media device 108 may buffer or store the content received from content server(s) 122 in database 208 for later playback on display device 106.

As noted above, media system 104 may include a display device remote control 140 in addition to system remote control 110. Display device remote control 140 may be specific to (i.e., native to) the display device 106, to control display device 106 (and may not be capable of controlling other devices such as media device 108). For example, where the display device 106 is a television, the display device remote control 140 may be the remote control that was included when the user 112 purchased the television. The display device remote control 140 may transmit commands from a command set supported by the display device 106, to control the display device 106. In some embodiments, an infrared (IR) transmitter 142 in the display device remote control 140 may transmit such commands as IR signals to an IR receiver 107 in the display device 107. It is noted that other devices in multimedia environment 102 may have IR transmitters, receivers and/or transceivers, such as media device 108, system remote control 110, etc.

Unlike display device remote control 140 that is able to control only display device 106, the system remote control 110 can be configured to control multiple devices in media system 104, such as but not limited to media device 108 and display device 106. System remote control 110 is able to achieve this functionality even though some devices, such as display device 106 (as well as other devices in media system 104) may support different (or at least partially different) command sets. At times herein, system remote control 110 is said to be non-native to the display device 106.

In some embodiments, user 112 may be required to manually program system remote control 110 to work with different devices in media system 104 (such as display device 106, for example). Assume display device 106 is a television, for example. In some embodiments, user 112 may be required to identify the command set supported by the television (by looking in the user manual or searching on-line, for example), and then input into the system remote control 110 the code associated with that command set. However, this can be a difficult and frustrating process for many users, especially users who are not technically inclined.

Accordingly, in other embodiments, media device 108 and/or crowdsource server 114 may automatically determine the functionality and capabilities of the display device 106 and/or other devices in media system 104. This may include determining the respective command sets of the devices in media system 104. Then, media device 108 may automatically configure system remote control 110 to operate with and control display device 106 and/or other devices in media system 104. Accordingly, embodiments solve the technical problem of enabling a single remote control to operate with and control multiple non-native devices in a media environment, where the command sets supported by the devices may differ, and/or may be unknown to users 112. Such features and advantages are achieved by causing media device and/or crowdsource server 114 to operate according to instructions representative of the operations described herein (such as shown in the flowcharts of FIGS. 4-9).

Figure 4:
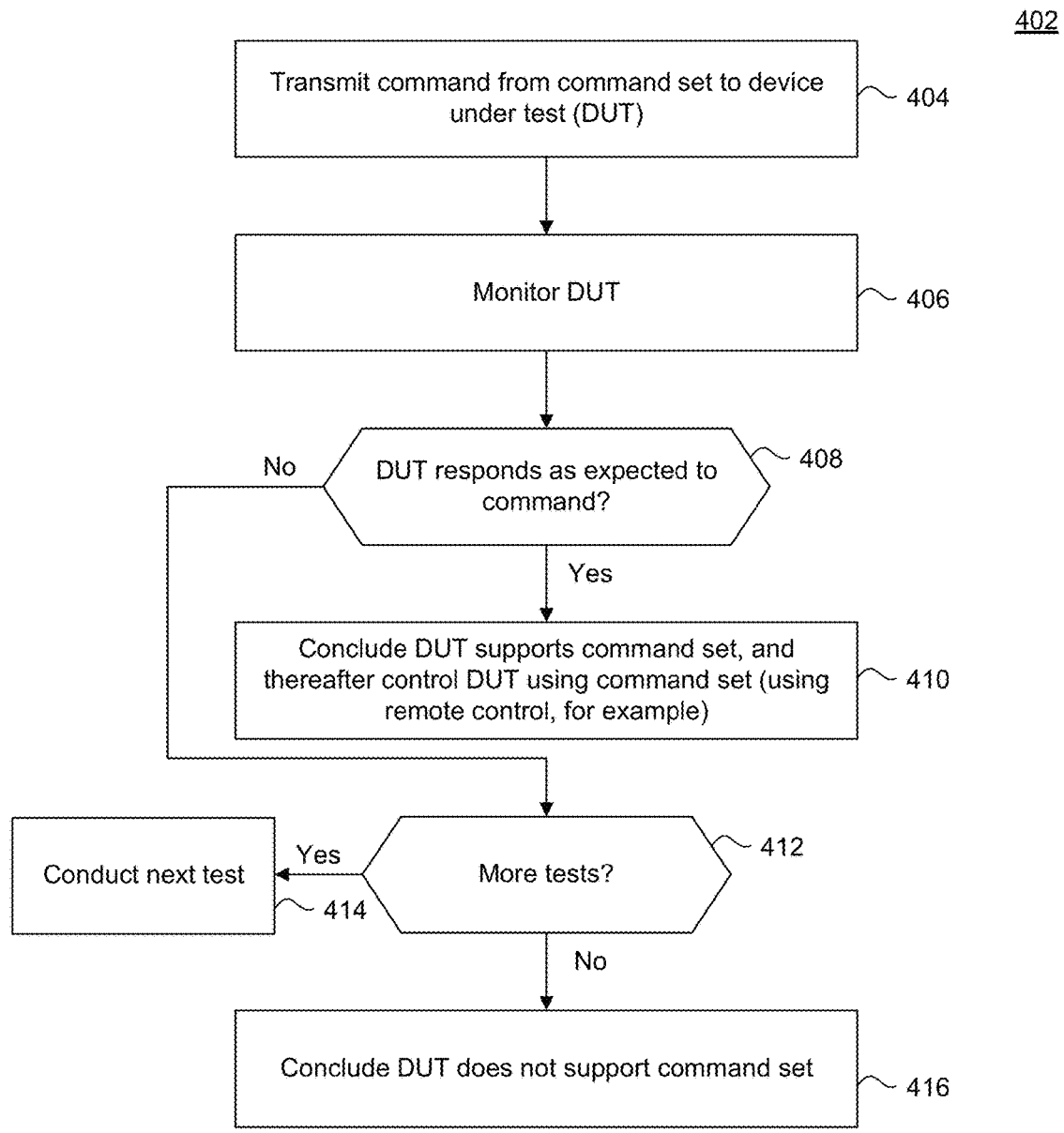
FIG. 4 illustrates a method for automatically determining the functionality and capabilities of a device under test (DUT) by monitoring how the DUT responds to commands, according to some embodiments.

Determining the Functionality and Capabilities of a Device Under Test (DUT) by Monitoring how the DUT Responds to Commands FIG. 4 illustrates a method 402 for automatically determining the functionality and capabilities of a device under test (DUT) by monitoring how the DUT responds to commands, according to some embodiments. Method 402 may be useful when it is not known what command set(s), if any, are supported by the DUT.

Method 402 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 402 shall be described with reference to FIGS. 1 and 2. However, method 402 is not limited to that example embodiment.

In 404, a command from a command set is transmitted to a DUT. For example, media device 108 may transmit a command to the display device 106 over a link 105. In some embodiments, link 105 may be an HDMI (High-Definition Multimedia Interface) link and the command may be from the Consumer Electronics Control (CEC) control set. As will be appreciated by persons skilled in the art, CEC is a feature of HDMI that allows users to command and control devices connected through HDMI using a single remote control.

In 406, signals transmitted by the DUT are monitored. In 408, it is determined whether the DUT responded as expected to the command. For example, in 406, media device 108 may monitor link 105 for signals transmitted by the display device 106. In 408, media device 108 may determine if signals received over link 105 from display device 106 are appropriate given the CEC command transmitted in 404 and the syntax of the associated command set (that is, the CEC command set).

If, in 408, the DUT responded as expected to the command, then in 410 it is determined that the DUT supports the command set associated with the command. For example, if the display device 106 responded as expected to the CEC command transmitted in step 404, then the media device 108 may conclude that the display device 106 supports CEC.

Also in 410, if it is determined the DUT supports the command set associated with the command, then thereafter the DUT is controlled using commands from that command set. For example, in some embodiments, the media device 108 may program or otherwise configure the system remote control 110 to interact with the display device 106 using the command set. In an embodiment, the media device 108 may transmit the command set to the system remote control 110 using its IR transceiver 216. The system remote control 110 may receive this command set using its IR transceiver 306, and store the received command set in the storage module 304. The received command set may be in the form of information identifying one of a number of command sets previously stored in the storage module 304 of the system remote control 110, or may be information specifying IR signals corresponding to commands in the command set. In this manner, the system remote control 110 is enabled to directly command and control the display device 106 by using its IR transceiver 306 to transmit IR signals to the display device 106.

Alternatively or additionally in 410, if it is determined the DUT supports the command set associated with the command, then thereafter the media device 108 commands and controls the DUT using commands from that command set. For example, assume it is determined in 410 that the DUT supports CEC. Then in 410, the media device 108 may thereafter control the display device 106 using CEC commands transmitted over the HDMI link 105, where such CEC commands correspond to commands issued by the system remote control 110, and where such commands issued by the system remote 110 are received and understood by the media device 108. For example, assume the user 112 uses the system remote control 110 to transmit a "volume up" command to the display device 106. Also assume the particular "volume up" command transmitted by the system remote control 110 is from a command set supported by the media device 108 but not supported by the display device 106. In this embodiment, the media device 108 may receive and recognize the "volume up" command. In response, the media device 108 may transmit a CEC "volume up" command to the display device 106 over the HDMI link 105, to thereby cause the display device 106 to increase volume.

If, in 410, it is determined the DUT did not respond as expected to the command issued in 404, then 412 is performed. In 412, it is determined whether there are more tests to perform to help identify a command set supported by the DUT. If there are more tests, then those tests are performed in step 414. For example, if there are other commands from the same or different command sets to interrogate the DUT with, then step 414 is implemented by returning control to step 404. Alternatively or additionally, if there are different tests or methods to perform—such as those described herein—then step 414 is implemented by performing those tests/methods.

If, in 412, it is determined there are no more tests to perform, then 416 is performed. In 416, it is determined the DUT does not support a command set currently recognized by media system 104. In this case, it is not possible to program or use system remote control 110 to control the display device 106. Instead, currently, the user 112 will be required to use the display device remote control 140 to control the display device 106. However, using a crowdsource embodiment (described below), the command set supported by the display device 106 may be recognized in the future. Accordingly, the media device 108 may perform flowchart 402 in the future to attempt to identify the command set supported by the display device 106 and enable the system remote control 110 to control the display device 106.

Figure 5:
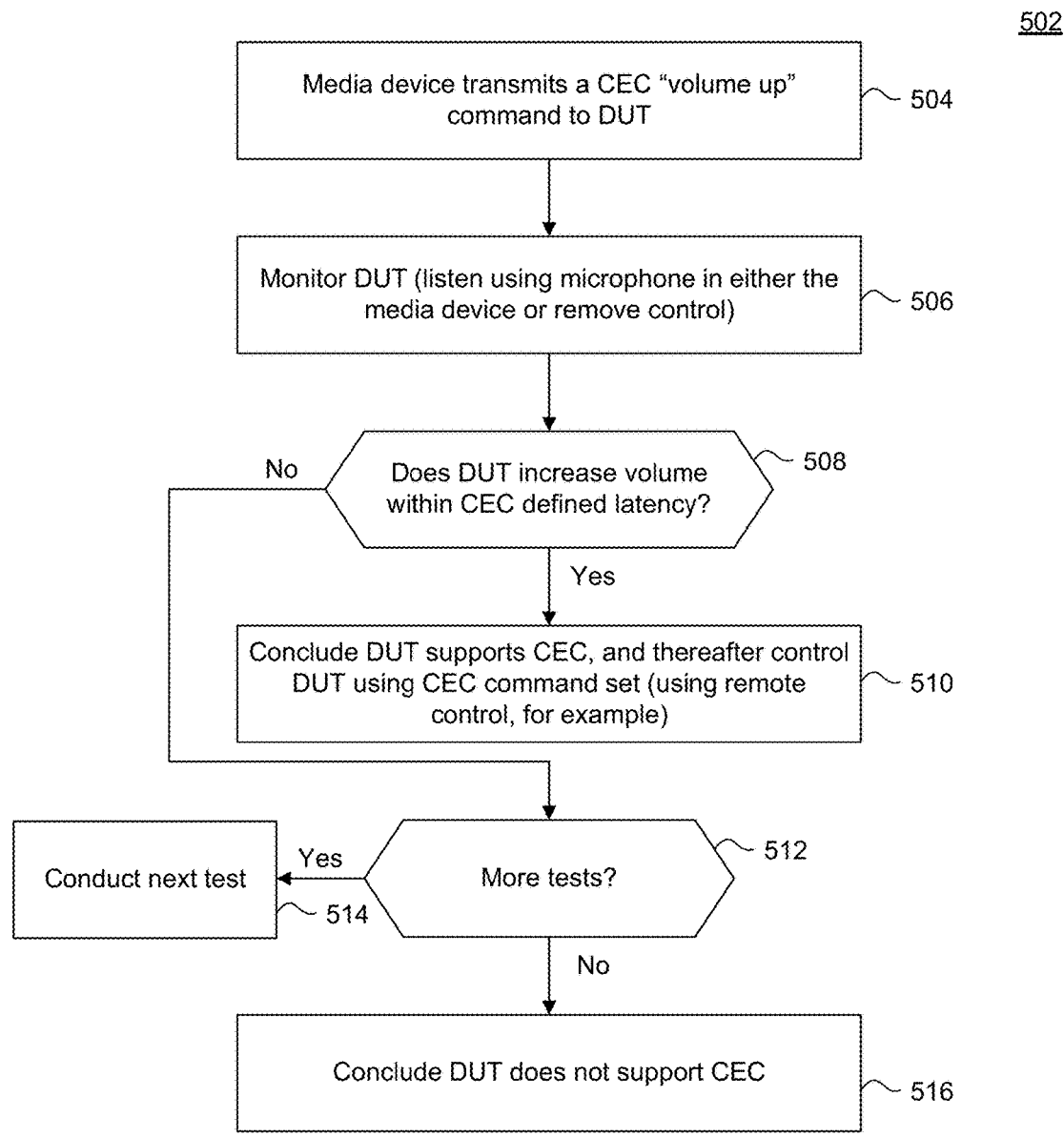
FIG. 5 illustrates a method for automatically determining the functionality and capabilities of a DUT by detecting and processing audible outputs of the DUT generated in response to commands, according to some embodiments.

Automatically Determining the Functionality and Capabilities of a DUT by Detecting and Processing Audible Outputs of the DUT Generated in Response to Commands FIG. 5 illustrates an example implementation of the method 402 of FIG. 4. In particular, FIG. 5 illustrates a method 502 for automatically determining the functionality and capabilities of a DUT by detecting and processing audible outputs of the DUT generated in response to commands, according to some embodiments. It is noted that, as used herein, the term audible includes sounds capable of being heard by humans, and sounds not capable of being heard by humans. Method 502 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 502 shall be described with reference to FIGS. 1-3. However, method 502 is not limited to that example embodiment.

In 504, media device 108 may transmit a CEC "volume up" command to the display device 106 over link 105. In an embodiment, link 105 is an HDMI link. It is noted that CEC and the CEC "volume up" command are used herein for illustrative purposes only, and this disclosure is not limited to that example embodiment. Method 502 is applicable to any other command set and any other command within such other command set, as long as there is a finite set of valid, audible responses to the command made by the DUT (that is, the display device 106). Step 504 generally corresponds to step 404 in FIG. 4.

In 506, media device 108 may monitor the audio outputs of display device 106 using its microphone 212, or microphone 305 in the system remote control 110. Step 506 generally corresponds to step 406 in FIG. 4.

In 508, responsive to the monitoring in step 506, media device 108 may determine if the display device 106 responded in a proper or valid way to the command issued in step 504, by analyzing the audio outputs of the display device 106. For example, display device 106 may determine if the display device 106 increased its volume after the CEC "volume up" command was issued in step 504. Step 508 generally corresponds to step 408 in FIG. 4.

If it is determined that the display device 106 responded in a proper or valid way to the command issued in step 504, then in step 510 the media device 108 may conclude that the display device 106 supports CEC. Thereafter, the system remote control 110 and/or the media device 108 may command and control the display device 106 using CEC commands, as discussed above with reference to step 410 of FIG. 4.

The remainder of flowchart 502—that is, steps 512, 514 and 516—respectively correspond to steps 412, 414 and 416 of FIG. 4.

Figure 6:
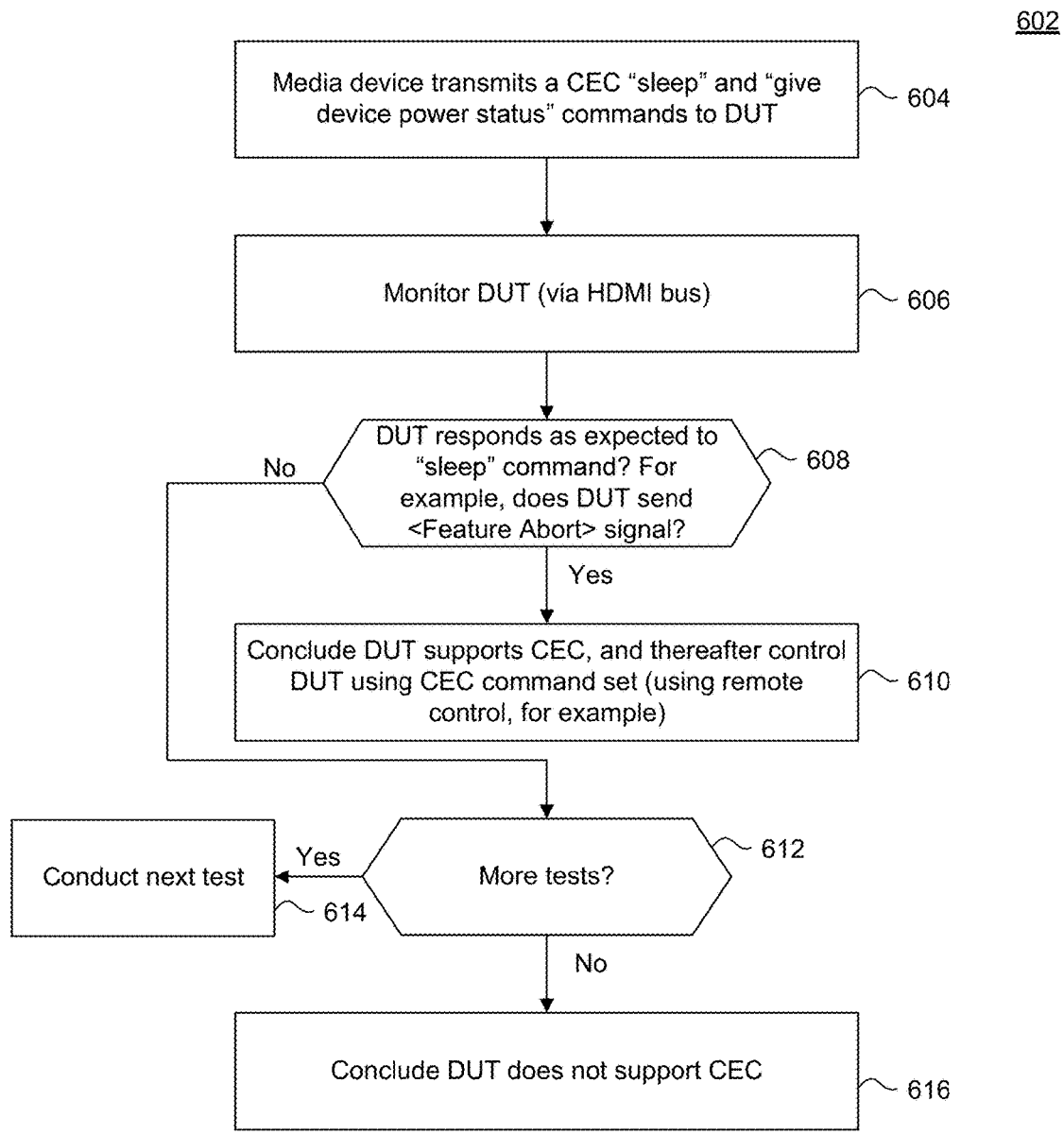
FIG. 6 illustrates a method for automatically determining the functionality and capabilities of a DUT by monitoring traffic on a bus to determine how the DUT responds to commands, according to some embodiments.

Automatically Determining the Functionality and Capabilities of a DUT by Monitoring Traffic on a Bus to Determine how the DUT Responds to Commands FIG. 6 illustrates an example implementation of the method 402 of FIG. 4. In particular, FIG. 6 illustrates a method 602 for automatically determining the functionality and capabilities of a DUT by monitoring traffic on a bus to determine how the DUT responds to commands, according to some embodiments. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 602 shall be described with reference to FIGS. 1 and 2. However, method 602 is not limited to that example embodiment.

In 604, media device 108 may transmit a CEC "sleep" command to the display device 106 over link 105. Then, the media device 108 may transmit a CEC "give device power status" command to the display device 106 over link 105. In an embodiment, link 105 is an HDMI link. It is noted that CEC and the CEC "sleep" and "give device power status" commands are used herein for illustrative purposes only, and this disclosure is not limited to that example embodiment. Method 602 is applicable to any other command set and any other command(s) within such other command set, as long as there is a finite set of valid responses to the command(s) that are transmitted by the DUT (that is, the display device 106) over the link 105. Step 604 generally corresponds to step 404 in FIG. 4.

In 606, media device 108 may monitor the link 105 for responses by the display device 106 to the sequence of CEC "sleep" and "give device power status" commands. Step 606 generally corresponds to step 406 in FIG. 4.

In 608, responsive to the monitoring in step 606, media device 108 may determine if the display device 106 responded in a proper or valid way to the command(s) issued in step 604, by analyzing the traffic over the link 105. For example, media device 108 may determine that the display device 106 responded properly if it transmitted a CEC "report power status" message over the HDMI link 105. As will be appreciated by persons skilled in the art, in some embodiments, the "report power status" message may be a proper response to the "give device power status" when the interrogated device has been put to sleep pursuant to the "sleep" command. Step 608 generally corresponds to step 408 in FIG. 4.

If it is determined that the display device 106 responded in a proper or valid way to the command issued in step 604, then in step 610 the media device 108 may conclude that the display device 106 supports CEC. Thereafter, the system remote control 110 and/or the media device 108 may command and control the display device 106 using CEC commands, as discussed above with reference to step 410 of FIG. 4.

The remainder of flowchart 602—that is, steps 612, 614 and 616—respectively correspond to steps 412, 414 and 416 of FIG. 4.

Figure 7A:
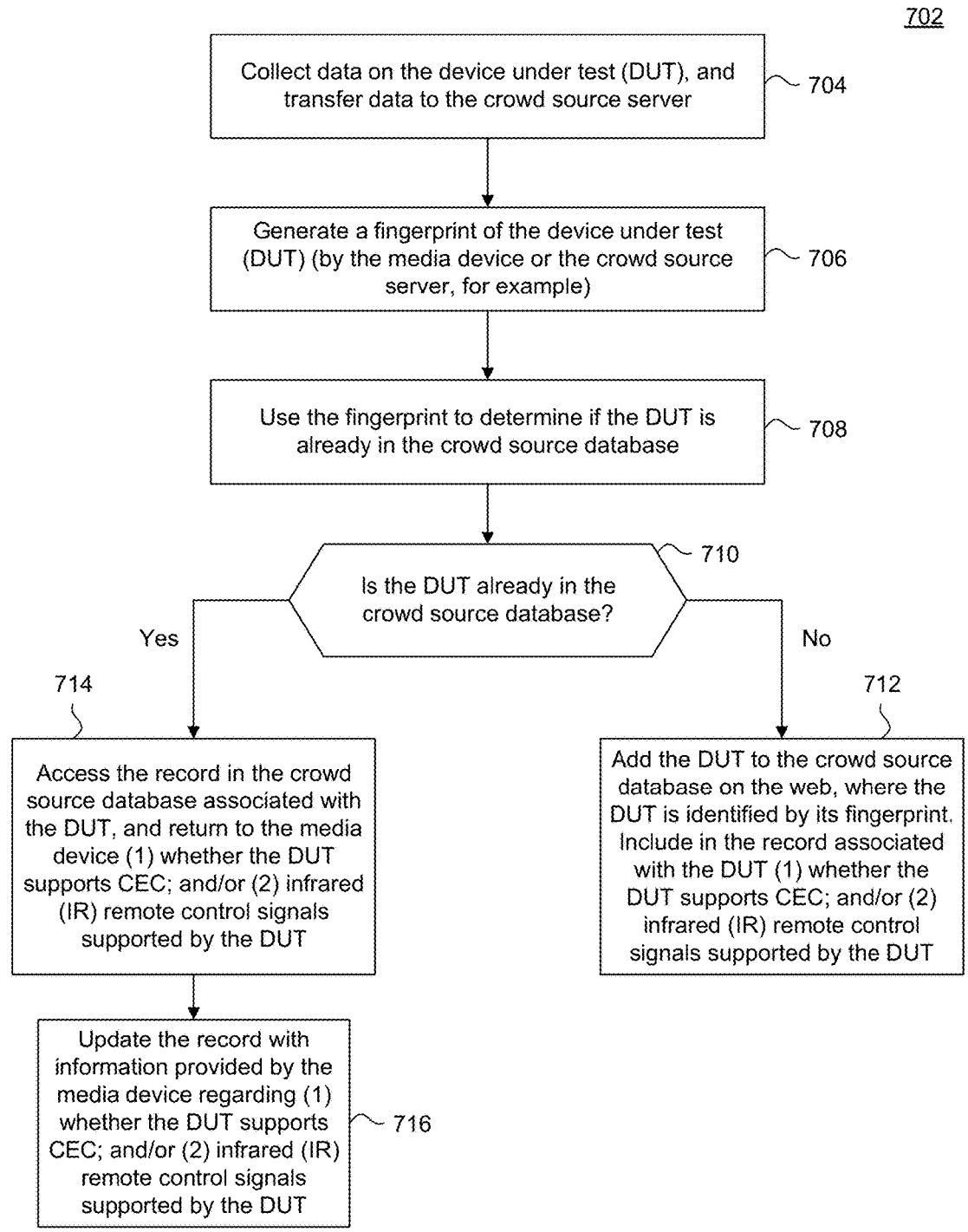
FIG. 7A illustrates a method for automatically determining the functionality and capabilities of a DUT by fingerprinting and crowdsourcing the DUT, according to some embodiments.

Automatically Determining the Functionality and Capabilities of a DUT by Fingerprinting and Crowdsourcing the DUT FIG. 7A illustrates a method 702 for automatically determining the functionality and capabilities of a DUT by fingerprinting and crowdsourcing the DUT. Method 702 may be part of flowchart 402 of FIG. 4—as step 414, for example—or may be stand alone and distinct from flowchart 402.

Method 702 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7A, as will be understood by a person of ordinary skill in the art. Method 702 shall be described with reference to FIGS. 1 and 2. However, method 702 is not limited to that example embodiment.

In 704, data may be collected on the DUT for purpose of generating an identification (sometimes called a fingerprint herein) of the DUT. The data collected in step 704 represents attributes, features and/or characteristics of the DUT.

For example, the media device 108 may collect such data on the display device 106. For example, the media device 108 may query or otherwise interact with the display device 106 over link 105 using well known standards or interfaces to collect data on the display device 106. Such well known standards or interfaces may include CEC and extended display identification data (EDID), for example. CEC was discussed above. As will be appreciated by persons skilled in the art, EDID is a standard published by the Video Electronics Standards Association (VESA) that defines an interface/data structure that can be used by a digital display (such as display device 106) to describe its capabilities to a content source (such as media device 108). Data collected in step 704 may include responses to CEC and/or EDID commands/messages and/or timing data of the latency of responding to such commands/messages.

Additionally or alternatively, data collected in step 704 may include timing relating to the HDCP negotiation process between the media device 108 and the display device 106. As will be appreciated by persons skilled in the art, HDCP (high-bandwidth digital content protection) is a form of digital copy protection to prevent copying of digital audio and video content as it travels across connections.

Additionally or alternatively, data collected in step 704 may include the model number of the display device 106. Specifically, the user 112 may be prompted to enter the model number of the display device 106 using the user interface 302 (i.e., a keypad or touch screen) of the system remote control 110. Or, the user 112 may be prompted to take a picture of the model number of the display device 106 using the camera 308 of the system remote control 110 (or any other handheld computing device, such as a smart phone). The media device 108 and/or crowdsource server 114 may then identify the model number of the display device 106 by applying character recognition techniques to the picture.

Also in step 704, the media device 108 may transmit this collected data to the crowdsource server 114 via network 120. The media device 108 may also transmit to the crowdsource server 114 information indicating whether or not the display device 106 supports CEC (as determined in steps 410, 510 and/or 610, as described above), and/or information specifying IR signals corresponding to remote control commands supported by the display device 106 (examples for determining such IR signals are described below with reference to FIGS. 8 and 9).

Figure 7B:
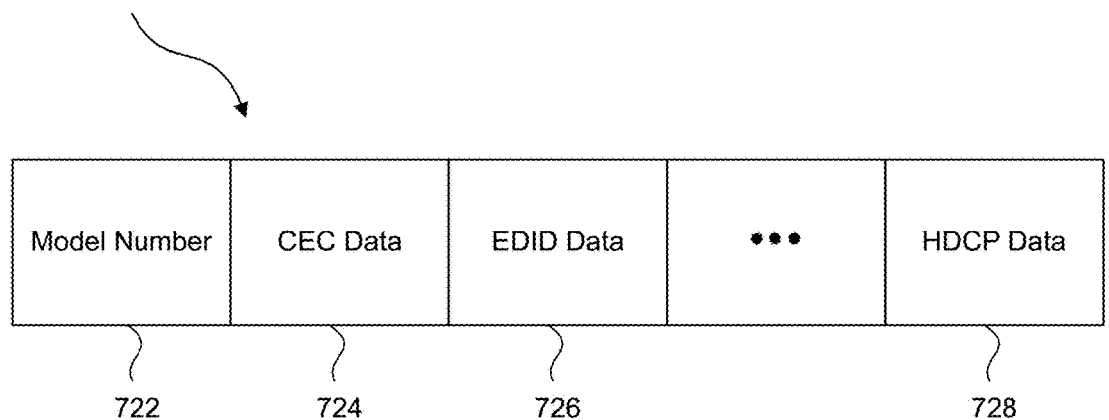
FIG. 7B illustrates an example fingerprint data structure, according to some embodiments.

In 706, a fingerprint of the DUT (that is, the display device 106) may be generated using the data collected in 704. As noted above, the data collected in step 704 represents attributes, features and/or characteristics of the display device 106. In 706, the collected data may be ordered and/or combined to generate a fingerprint of the display device 106. FIG. 7B illustrates an example data structure 720 of a fingerprint, according to some embodiments. Fingerprint data structure 720 may include a model number field 722, a CEC data field 724, an EDID data field 726, a HDCP data field 728, as well as other fields corresponding to data collected in step 704. In some embodiments, the fingerprint of display device 106 is generated by processing module 204 of the media device 108, and then transmitted to the crowdsource server 114 over network 120. In other embodiments, the data collected in step 704 is transmitted to the crowdsource server 114 over network 120 (as part of step 704), and a fingerprint module 130 in the crowdsource server 114 generates the fingerprint of display device 106.

In 708, the crowdsource server 114 uses the fingerprint to determine if the display device 106 is represented in a device remote control database 132. FIG. 7C illustrates an example device remote control database 132, according to some embodiments. Each unique fingerprint has a row 746 in the device remote control database 132. A fingerprint's row 746 may store (1) the fingerprint in a "Fingerprint" column 740, (2) whether or not the DUT corresponding to the fingerprint supports CEC (or other standards or command sets) in a "CEC Supported" column 742, and/or (3) information specifying IR signals of remote control commands supported by the DUT in a "Remote Control Signals" column 744.

It is noted that some fingerprints may be similar. This is indicated in the example of FIG. 7C by fingerprints B, B' and B" in rows 746B, 746c and 746D. Different media devices 108 in different media systems 104 may use the same display device 106 (that is, the same television, for example). But, these different media devices 108 may have collected different data on the display device in step 704, resulting in the generation of different fingerprints in step 706. The different data may be the result of variabilities in the televisions (some may be older, newer, refurbished, damaged, etc.), and/or the gathering of different information by the media devices 108 in step 704. As a result, the same television model may have multiple entries in the device remote control database 132.

The crowdsource server 114 performs step 708 by matching the fingerprint generated in step 706 with the fingerprints in the Fingerprint column 740 of the rows 746 of the device remote control database 132. If no match exists, then in step 710, the crowdsource server 114 determines that the DUT is not currently represented in the device remote control database 132. Accordingly, in step 712, the crowdsource server 114 adds a new row 746 to the device remote control database 132. The crowdsource server 114 inserts the fingerprint from step 706 in the Fingerprint column 740 of the new row 746. The crowdsource server 114 inserts information indicating whether or not the DUT supports CEC (if provided in step 704) in the CEC Supported column 742 of the new row 746. The crowdsource server 114 inserts information specifying IR signals corresponding to remote control commands supported by the DUT (if provided in step 704) into the Remote Control Signals column 744 of the new row 746.

Returning to step 710, if a fingerprint match exists, then in step 710, the crowdsource server 114 determines that the DUT is already represented in the device remote control database 132. Accordingly, in step 714, the crowdsource server 114 retrieves from the matching row 746 information indicating whether or not the DUT supports CEC from the CEC Supported column 742 of the matching row 746 (if such information is present in the matching row 746), and information specifying IR signals corresponding to remote control commands supported by the DUT from the Remote Control Signals column 744 of the matching row 746 (if such information is present in the matching row 746).

The crowdsource server 114 provides such retrieved information to the media device 108 from step 704. The Media device 108 may use such information to control the display device 106. For example, assume such information provided by the crowdsource server 114 indicates that the display device 106 supports CEC. Then, the media device 108 may thereafter control the display device 106 using CEC commands transmitted over the HDMI link 105, where such CEC commands correspond to commands issued by the system remote control 110, and where such commands issued by the system remote 110 are received and understood by the media device 108. For example, assume the user 112 uses the system remote control 110 to transmit a "volume up" command to the display device 106. Also assume the particular "volume up" command transmitted by the system remote control 110 is from a command set supported by the media device 108 but not supported by the display device 106. In this embodiment, the media device 108 may receive and recognize the "volume up" command. In response, the media device 108 may transmit a CEC "volume up" command to the display device 106 over the HDMI link 105, to thereby cause the display device 106 to increase volume.

Additionally or alternatively, assume such information provided by the crowdsource server 114 specifies IR signals corresponding to remote control commands supported by the display device 106. In this embodiment, the media device 108 may use its IR transceiver 216 to transmit this information to the IR transceiver 306 in the system remote control 110. The system remote control 110 may store the received information in the storage module 304. In this manner, the media device 108 can program the system remote control 110 to directly communicate with and control the display device 106 using the stored IR signals (which are supported by the display device 106).

In 716, the crowdsource server 114 updates the CEC Supported column 742 of the matching row 746 with information indicating whether or not the DUT supports CEC (if provided in step 704). The crowdsource server 114 also updates the Remote Control Signals column 744 of the matching row 746 with information specifying IR signals corresponding to remote control commands supported by the DUT (if provided in step 704). In some embodiments, such updates add to rather than replace the information already existing in the matching row. For example, whether or not the DUT supports CEC (as indicated by the CEC Supported column 742) may be set by a majority vote of the data received in step 704 or by some other heuristic applied to the data received in step 704 from media devices 108 (for example, if 5 media devices 108 indicate the DUT supports CEC, and 3 indicate the DUT does not support CEC, then the crowdsource server 114 indicates in the CEC Supported column 742 of the matching row 746 that the DUT supports CEC). Similarly, the IR signals in the Remote Control Signals column 742 may be populated from data received in step 704 from multiple media devices 108, with conflicts resolved by majority vote (for example, if 2 media devices 108 indicate the volume up IR code is ABC, and 3 indicate the IR code is XYZ, then XYZ is saved in the Remote Control Signals column 742 of the matching row 746) or by some other heuristic. In this manner, information in the device remote control database 132 is continually updated and improved by crowdsourcing information from multiple media devices 108 in multiple media systems 104.

Figure 8:
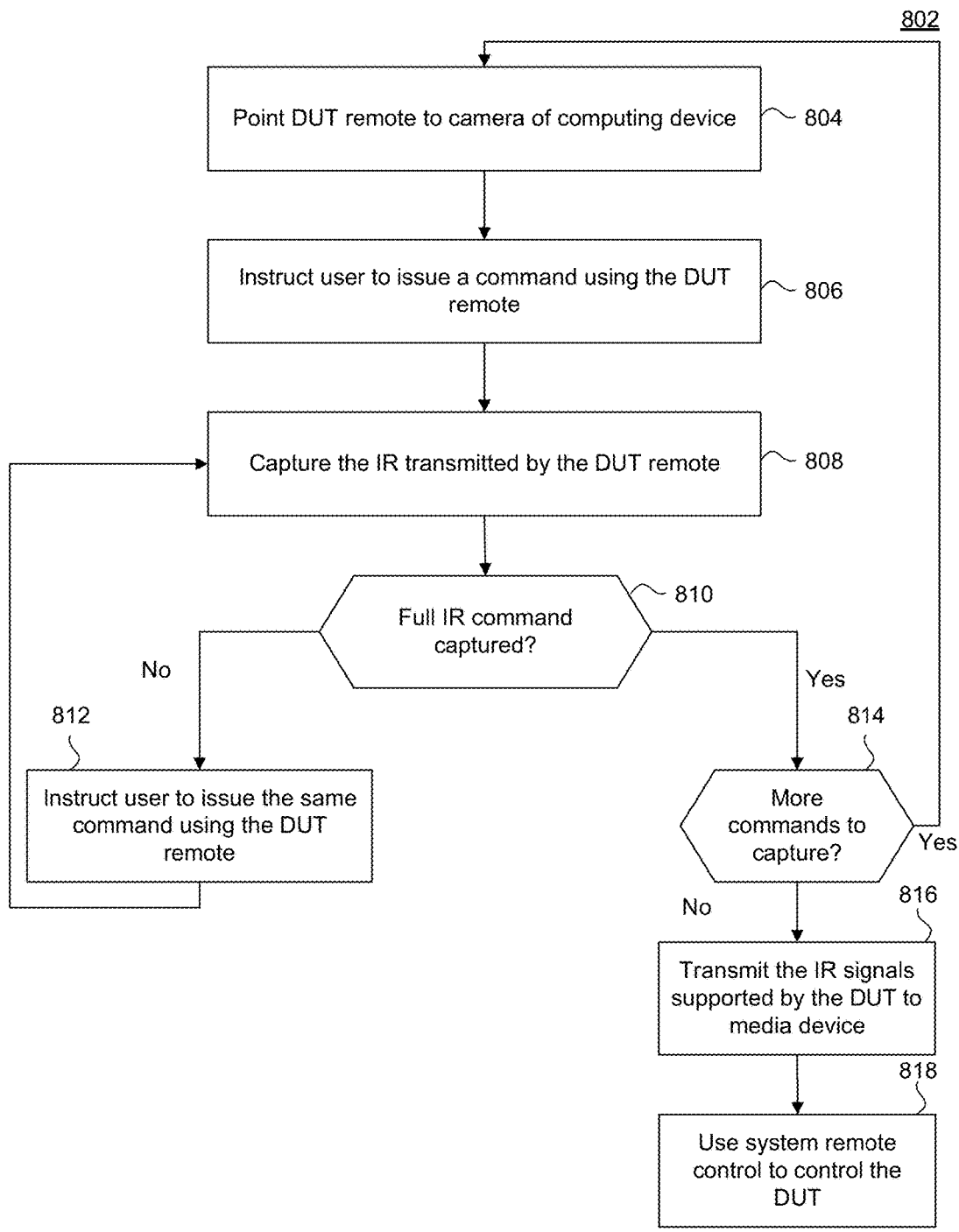
FIGS. 8 and 9 illustrate methods for determining infrared signals transmitted by a remote control and associated with commands of interest, according to some embodiments.

Determining Infrared Signals Transmitted by a Remote Control and Associated with Commands of Interest FIG. 8 illustrates a method 802 for determining infrared signals transmitted by a remote control and associated with commands of interest, according to some embodiments. Method 802 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. Method 802 shall be described with reference to FIGS. 1-3. However, method 802 is not limited to that example embodiment.

In 804, user 112 points the IR transmitter 142 of the display device remote control 140 to the camera 308 of the system remote control 110 (or any other computing device having the functionality of the system remote control 110, such as a smart phone, tablet computer, laptop computer, digital assistant, etc.).

In 804, the user 112 is instructed to issue a command using the display device remote control 140. The instruction may be transmitted by the media device 108 and displayed on a screen of the system remote control 110 or on the display device 106. The user 112 may issue the command by pressing a button on the display device remote control 140. Assume, for purposes of illustration, the user 112 presses the Volume Up button on the display device remote control 140.

In 806, the camera 308 of the system remote control 110 captures the IR signal transmitted by the IR transmitter 142 of the display device remote control 140.

In some embodiments, the camera 308 of the system remote control 110 may have IR filters or other well-known functional and/or structural features to facilitate the capture of IR signals. In other embodiments, the camera 308 may lack some or all of those features. For example, the shutter speed of the camera 308 may be too slow to fully capture an IR signal in a single transmission. Accordingly, in step 810, the IR processing module 310 determines if the IR signal was fully captured in step 808. If the IR signal was not fully captured, then in step 812, the user 112 is requested to issue the same command using the display device remote control 140. The IR signal is again captured by the camera 308 in step 808, and then combined with previous captures of the IR signal. Steps 808-812 are repeated until the IR processing module 310 in step 810 determines that the IR signal corresponding to the command of step 806 has been fully captured.

Once the IR processing module 310 determines in 810 that the IR signal has been fully captured, then control moves to 814. In 814, the media device 108 or the system remote control 110 determines if there are more commands of the display device remote control 140 that need to be captured. If there are more commands to capture, then control returns to step 804.

Otherwise, in 816, the system remote control 110 transmits the IR signals corresponding to commands of the display device remote control 140 (which were collected in steps 804-814) to the media device 108. Such transmission may occur as each IR signal is collected, or as batches of the IR signals. The media device 108 may then transmit these IR signals to the crowdsource server 114 in step 704 of FIG. 7A, as described above. The system remote control 110 may also save these IR signals in the storage module 304.

In 818, the system remote control 110 may use the IR signals stored in the storage module 304 to directly communicate with and control the display device 106. As a result of flowchart 802, the system remote control 110—which is not natively supported by the display device 106—is configured/programmed to directly communication with and control the display device 106.

Figure 9:
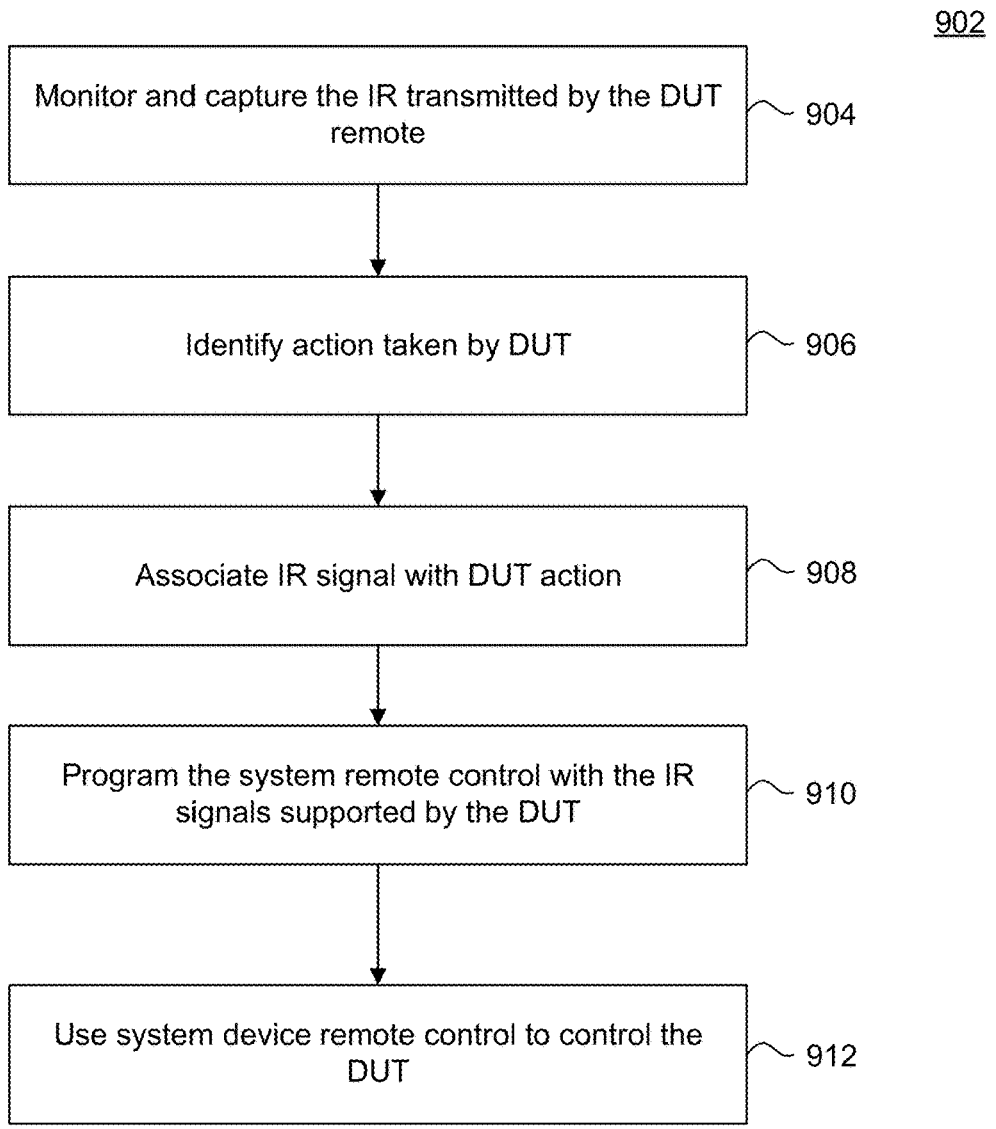

FIG. 8 requires the involvement of the user 112 to detect the IR codes of the display device remote control 140. Additionally or alternatively, FIG. 9 illustrates a method 902 for determining IR signals transmitted by the display device remote control 140, without the need of user involvement. Method 902 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Method 902 shall be described with reference to FIGS. 1-3. However, method 902 is not limited to that example embodiment.

In 904, a high-gain, wideband IR sensor/detector 109 monitors and captures IR signals transmitted by the display device remote control 140. In some embodiments, the wideband IR detector 109 includes IR filters or other well-known functional and/or structural features to facilitate the capture of IR signals. The wideband IR detector 109 is positioned proximate to the display device 106 and/or the media device 108. The wideband IR detector 109 transmits the captured IR signal to the media device 108.

In 906, the media device 108 identifies the action(s) taken by the display device 106 after transmission of the IR signals by the display device remote control 140 in step 904. In some embodiments, the media device 108 may perform 906 by monitoring the CEC traffic on the HDMI link 105, or listening on microphone 212 for audible actions taken by the display device (such as turning off or changing the volume level, for example).

In 908, the media device 108 may associate the IR signals captured in step 904 with the action(s) identified in 906. In other words, the media device 108 may determine that the IR signals are associated with a command of the display device remote control 140 to cause the display device 106 to perform the identified action.

Steps 904-908 may be periodically or continuously performed to identify the IR signals associated with the command set supported by the display device remote control 140 and the display device 106.

In 910, the media device 108 may transmit information specifying these IR signals associated with the command set of the display device remote control 140 and the display device 106 to the system remote control 110. The system remote control 110 may store such information in its storage module 304. As a result of flowchart 902, the system remote control 110—which is not natively supported by the display device 106—is configured/programmed to directly communication with and control the display device 106.

The media device 108 may also transmit these IR signals to the crowdsource server 114 as part of step 704 of FIG. 7A, as described above.

In 912, the system remote control 110 may use these stored IR signals to directly communicate with and control the display device 106.

Example Computer System

Figure 10:
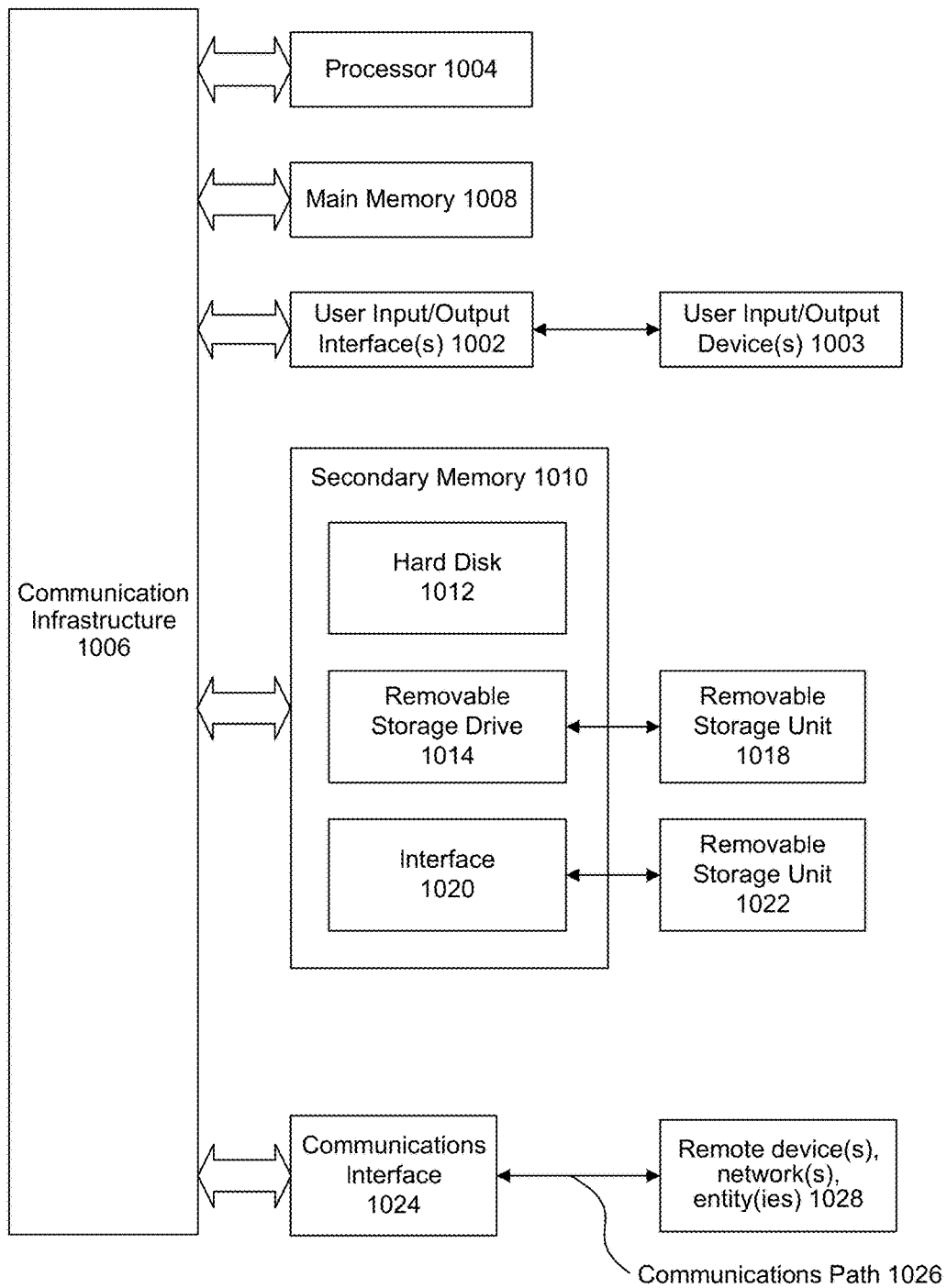
FIG. 10 illustrates an example computer system useful for implementing various embodiments.

Various embodiments and/or components therein can be implemented, for example, using one or more computer systems, such as computer system 1000 shown in FIG. 10. Computer system 1000 can be any computer or computing device capable of performing the functions described herein. For example, one or more computer systems 1000 can be used to implement any embodiments of FIGS. 1-9, and/or any combination or sub-combination thereof.

Computer system 1000 includes one or more processors (also called central processing units, or CPUs), such as a processor 1004. Processor 1004 is connected to a communication infrastructure or bus 1006.

One or more processors 1004 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1000 also includes user input/output device(s) 1003, such as monitors, keyboards, pointing devices, etc., that communicate with communication infrastructure 1006 through user input/output interface(s) 1002.

Computer system 1000 also includes a main or primary memory 1008, such as random access memory (RAM). Main memory 1008 can include one or more levels of cache. Main memory 1008 has stored therein control logic (i.e., computer software) and/or data.

Computer system 1000 can also include one or more secondary storage devices or memory 1010. Secondary memory 1010 can include, for example, a hard disk drive 1012 and/or a removable storage device or drive 1014. Removable storage drive 1014 can be a floppy disk drive, a magnetic tape drive, a compact disk drive, an optical storage device, tape backup device, and/or any other storage device/drive.

Removable storage drive 1014 can interact with a removable storage unit 1018. Removable storage unit 1018 includes a computer usable or readable storage device having stored thereon computer software (control logic) and/or data. Removable storage unit 1018 can be a floppy disk, magnetic tape, compact disk, DVD, optical storage disk, and/any other computer data storage device. Removable storage drive 1014 reads from and/or writes to removable storage unit 1018 in a well-known manner.

According to an exemplary embodiment, secondary memory 1010 can include other means, instrumentalities or other approaches for allowing computer programs and/or other instructions and/or data to be accessed by computer system 1000. Such means, instrumentalities or other approaches can include, for example, a removable storage unit 1022 and an interface 1020. Examples of the removable storage unit 1022 and the interface 1020 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 can further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 can allow computer system 1000 to communicate with remote devices 1028 over communications path 1026, which can be wired and/or wireless, and which can include any combination of LANs, WANs, the Internet, etc. Control logic and/or data can be transmitted to and from computer system 1000 via communication path 1026.

In some embodiments, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method of automatically determining the functionality and capabilities of a device in a media system, comprising:
    transmitting, by a media device, a command to the device;
    receiving, by the media device, signals transmitted by the device, wherein the received signals include information responding to the command;
    generating, by the media device, a fingerprint identifying the device based on the received signals, wherein the fingerprint comprises the information;
    querying, by the media device, a crowdsource server using the fingerprint;
    determining, by the media device and based on the querying, that the fingerprint does not exist in the crowdsource server; and
    transmitting, by the media device, the fingerprint to the crowdsource server.

2. The method of claim 1, wherein the transmitting comprises transmitting an audible control command to the device, and wherein the monitoring comprises using a microphone to detect volume changes made by the device in response to the audible control command.

3. The method of claim 1, wherein the transmitting comprises transmitting a Consumer Electronics Control (CEC) command to the device over an HDMI link, and wherein the monitoring comprises monitoring traffic over the HDMI link for messages transmitted by the device, and further wherein the second determining comprises determining the device supports CEC.

4. The method of claim 1, further comprising:
    determining that the device supports a command set that comprises the command.

5. The method of claim 4, further comprising:
    receiving crowdsourced information from the crowdsource server specifying infrared (IR) signals corresponding to remote control commands supported by the device; and
    transmitting the received crowdsourced information to a remote control that is not supported by the device,
    wherein the remote control uses the received crowdsourced information to control the device.

6. The method of claim 2, further comprising:
    intercepting a command from a remote control to control the device, wherein the device does not support the remote control; and
    transmitting a CEC command corresponding to the intercepted command to the device over the HDMI link, to thereby cause the device to perform the intercepted command.

7. A system for automatically determining the functionality and capabilities of a device in a media system, comprising:
    a memory; and
    at least one processor operatively coupled to the memory, the processor configured to:
    transmit a command to the device;
    receive signals transmitted by the device, wherein the received signals include information responding to the command;
    generate a fingerprint identifying the device based on the received signals, wherein the fingerprint comprises the information;
    query a crowdsource server using the fingerprint;
    determine, based on the querying, that the fingerprint does not exist in the crowdsource server; and
    transmit the fingerprint to the crowdsource server.

8. The system of claim 7, wherein to transmit the processor is configured to transmit a Consumer Electronics Control (CEC) command to the device over an HDMI link, and wherein to monitor the processor is configured to monitor traffic over the HDMI link for messages transmitted by the device, and further wherein to determine that the device supports a command set the processor is configured to determine the device supports CEC.

9. The system of claim 7, wherein the processor is further configured to:
    receive crowdsourced information from the crowdsource server specifying infrared (IR) signals corresponding to remote control commands supported by the device; and transmit the received crowdsourced information to a remote control that is not supported by the device, wherein the remote control uses the received crowdsourced information to control the device.

10. The system of claim 7, wherein the processor is further configured to:

intercept a command from a remote control to control the device, wherein the device does not support the remote control; and transmit a CEC command corresponding to the intercepted command to the device over the HDMI link, to thereby cause the device to perform the intercepted command.

11. A non-transitory, tangible computer-readable device having instructions stored thereon that, when executed by at least one computing device, causes the at least one computing device to perform operations comprising:

transmitting a command to the device;

receiving signals transmitted by the device, wherein the received signals include information responding to the command;

generating a fingerprint identifying the device based on the received signals, wherein the fingerprint comprises the information;

querying a crowdsource server using the fingerprint;

determining, based on the querying, that the fingerprint does not exist in the crowdsource server; and transmitting the fingerprint to the crowdsource server.

12. The non-transitory, tangible computer-readable device of claim 11, wherein the transmitting comprises transmitting an audible control command to the device, and wherein the monitoring comprises using a microphone to detect volume changes made by the device in response to the audible control command.

13. The non-transitory, tangible computer-readable device of claim 11, wherein the transmitting comprises transmitting a Consumer Electronics Control (CEC) command to the device over an HDMI link, and wherein the monitoring comprises monitoring traffic over the HDMI link for messages transmitted by the device, and further wherein the second determining comprises determining the device supports CEC.

14. The non-transitory, tangible computer-readable device of claim 11, the operations further comprising:

determining that the device supports a command set that comprises the command.

15. The non-transitory, tangible computer-readable device of claim 14, the operations further comprising:

receiving crowdsourced information from the crowdsource server specifying infrared (IR) signals corresponding to remote control commands supported by the device; and transmitting the received crowdsourced information to a remote control that is not supported by the device, wherein the remote control uses the received crowdsourced information to control the device.

16. The non-transitory, tangible computer-readable device of claim 12, the operations further comprising:

intercepting a command from a remote control to control the device, wherein the device does not support the remote control; and transmitting a CEC command corresponding to the intercepted command to the device over the HDMI link, to thereby cause the device to perform the intercepted command.

17. The method of claim 1, wherein the transmitting comprises:

prompting a request for a model number of the device.

18. The method of claim 17, further comprising:

receiving, responsive to the prompt, an image comprising a picture of the model number of the device from a remote control associated with the command.

19. The method of claim 17, wherein the fingerprint further comprises a model number field and a CEC data field.

20. The method of claim 1, wherein the adding comprises:

transmitting information corresponding to remote control commands supported by the device to the crowdsource server, wherein the commands comprise infrared (IR) signals.

* * * * *